United States Patent
Gao et al.

(10) Patent No.: US 9,075,833 B2
(45) Date of Patent: Jul. 7, 2015

(54) GENERATING XML SCHEMA FROM JSON DATA

(71) Applicant: International Business Machines Corporation, Armonk, NY (US)

(72) Inventors: Shudi Gao, Richmond Hill (CA); Jeff J. Li, Boca Raton, FL (US); James P. Schmeiser, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 13/746,007

(22) Filed: Jan. 21, 2013

(65) Prior Publication Data

US 2014/0207826 A1    Jul. 24, 2014

(51) Int. Cl.
*G06F 17/30* (2006.01)

(52) U.S. Cl.
CPC .... *G06F 17/30292* (2013.01); *G06F 17/30914* (2013.01); *G06F 17/30923* (2013.01)

(58) Field of Classification Search
CPC .................. G06F 17/30292; G06F 17/30914; G06F 17/30923
USPC ........................................................ 707/803
See application file for complete search history.

(56) References Cited

U.S. PATENT DOCUMENTS

| | | | |
|---|---|---|---|
| 6,569,207 B1 * | 5/2003 | Sundaresan | 715/234 |
| 6,732,330 B1 * | 5/2004 | Claussen et al. | 715/234 |
| 6,918,107 B2 * | 7/2005 | Lucas et al. | 717/124 |
| 7,194,485 B2 * | 3/2007 | Kaipa et al. | 1/1 |
| 7,640,495 B2 * | 12/2009 | Ballinger et al. | 715/237 |
| 7,711,755 B2 * | 5/2010 | Cruver | 707/803 |
| 7,761,484 B2 * | 7/2010 | Christensen et al. | 707/807 |
| 8,260,784 B2 | 9/2012 | Beyer et al. | |
| 2003/0110446 A1 * | 6/2003 | Nemer | 715/513 |
| 2004/0015840 A1 * | 1/2004 | Walker | 717/108 |
| 2004/0143823 A1 * | 7/2004 | Wei | 717/140 |
| 2005/0039166 A1 * | 2/2005 | Betts et al. | 717/114 |
| 2005/0154978 A1 * | 7/2005 | Albornoz et al. | 715/513 |
| 2005/0268223 A1 | 12/2005 | Hanson et al. | |
| 2006/0041838 A1 | 2/2006 | Khan | |
| 2008/0010629 A1 * | 1/2008 | Berg et al. | 717/116 |
| 2009/0248737 A1 * | 10/2009 | Shukla et al. | 707/103 R |
| 2010/0185862 A1 | 7/2010 | Moore et al. | |
| 2010/0185869 A1 | 7/2010 | Moore et al. | |
| 2010/0242018 A1 | 9/2010 | Balfe et al. | |

(Continued)

FOREIGN PATENT DOCUMENTS

WO    2009015569 A1    5/2009

OTHER PUBLICATIONS

Lee, David, "JXON: An Architecture for Schema and Annotation Driven JSON/XML Bi-directional Transformation", Proc. of Balisage: The Markup Conference, © 2011, pp. 1-22.*

(Continued)

*Primary Examiner* — Robert Stevens
(74) *Attorney, Agent, or Firm* — Isaac J. Gooshaw (57) ABSTRACT

A computer receives a first JSON data that includes at least one JSON array or JSON object value. The computer parses a stream of JSON data, wherein the stream of JSON data includes at least a part of the first JSON data. The computer determines the logical structure of the first JSON data using the parsed stream of JSON data. The computer generates an XML schema based on the logical structure of the first JSON data.

20 Claims, 5 Drawing Sheets

(56) References Cited

U.S. PATENT DOCUMENTS

| | | | |
|---|---|---|---|
| 2011/0099194 | A1 | 4/2011 | Trevor et al. |
| 2011/0099502 | A1 | 4/2011 | Kim et al. |
| 2011/0119652 | A1 | 5/2011 | Yu et al. |
| 2011/0153630 | A1 | 6/2011 | Vernon et al. |
| 2011/0302269 | A1* | 12/2011 | Keene ............................ 709/217 |
| 2011/0320926 | A1 | 12/2011 | Agarwal et al. |
| 2012/0084629 | A1 | 4/2012 | Patrawala et al. |
| 2012/0254719 | A1* | 10/2012 | Hackmann et al. ........... 715/234 |
| 2014/0181141 | A1* | 6/2014 | Sowell et al. ................. 707/769 |

OTHER PUBLICATIONS

Gatti, Maira, et al., "Domain-Independent Data Validation and Content Assistance as a Service", 2012 IEEE 19th Int'l Conf. on Web Services, Honolulu, HI, Jun. 24-29, 2012, pp. 407-414.*

Rutkauskas, R., Maira, et al., "New Challenges for Interoperability of Control Systems", Electronics & Electrical Engineering, vol. 83, © 2008, pp. 71-74.*

Goessner, Stefan, "Converting Between XML and JSON", xml.com, downloaded from: www.xml.com/lpt/a/1658, May 28, 2009, pp. 1-6.*

Wang, Guanhua, et al., "Improving Data Transmission in Web Applications via the Translation between XML and JSON", CMC 2011, Qingdao, China, Apr. 18-20, 2011, pp. 182-185.*

Richter, Wolfram, et al., "Realizing the value of IBM Business Process Manager in the WebSphere Portal environment, Part 3: Agile development of custom user interfaces using Web Experience Factory", IBM developerWorks, Sep. 26, 2012, pp. 1-21.*

Avdiu, Faton, et al., "Build a pureXML and JSON application, Part 2: Create Universal Services for pureXML that expose JSON", IBM developerWorks, Apr. 27, 2010, pp. 1-15.*

Boyer, John et al.; "Experiences with JSON and XML Transformations"; IBM Submission to W3C Workshop on Data and Services Integration; Oct. 20-21, 2011; Bedford, MA; Copyright IBM.

"public fge/json-schema-validator"; github; Printed Oct. 8, 2012; <https://github.com/fge/json-schema-validator>.

"Jackson Java JSON-processor"; Jackson High-performance JSON processor; Copyright 2003-2008 Codehaus; Printed Oct. 8, 2012; <http://jackson.codehaus.org/>.

Wang, Guanhua; "Improving Data Transmission in Web Applications via the Translation between XML and JSON"; 2011 Third International Conference on Communications and Mobile Computing; pp. 182-185; IEEE Computer Society; Copyright 2011 IEEE.

* cited by examiner

GENERATING XML SCHEMA FROM JSON DATA

FIELD OF THE INVENTION

The present invention relates generally to the field of data processing, and more particularly to generating an XML schema from JSON data to parse, validate, and transform JSON data.

BACKGROUND OF THE INVENTION

To communicate with one another, computers use various protocols and message formats. A computer system is only able to interpret messages in formats for which the computer system includes an appropriate serialization stack used to convert the message to usable application data or objects. As such, computing systems may include application programming interfaces (APIs) which developers use to program the computer system to incorporate certain functionality, while allowing appropriate message formats to be implemented for inter-computer system communication.

In recent years, use of the eXtensible Markup Language (XML) has become increasingly prevalent in business. This trend is largely attributable to the flexibility of XML as a mechanism for defining the structure and content of data. XML is a self-descriptive markup language that is finding ever wider application as a data transmission and processing tool. XML is efficient at describing and defining data and is therefore used ever increasingly in data intensive applications. In this way, XML is different from HTML, which was designed for displaying data. XML data can be readily transmitted between computers using any type of data transmission media. XML data can be processed using computer programs and other suitably configured applications. An XML file may be received by an application and processed to generate an output. XML allows users to define schemas comprising a set of elements and attributes in a structural relationship to define a non-programming language specific data type (i.e. a data type that is defined without use of particular programming language). The elements and attributes defined in an XML schema may then be used as "tags" or labels in one or more XML instance documents (i.e. XML documents conforming to an XML schema and containing actual data) which may instantiate earlier defined data types. When XML instance documents are forwarded to other users or enterprises, the XML schema may be used by the recipient to "understand" and/or validate the instance document. Sharing of data across divergent operating systems and platforms is thus supported.

As might be imagined, all formats are not compatible with one another. For example, Web Services is a standardized way of integrating applications. Standardized XML documents can be used with SOAP (Simple Object Access Protocol) messages and WSDL (Web Services Description Language) descriptions to integrate applications without an extensive knowledge of the applications being integrated. Alternatively, a text-based dynamic language designed for human-readable data interchange, such as JavaScript Object Notation (JSON) may be used as a format for sending data. Each of these formats is interpreted by different incompatible serialization stacks. Some of the difficulty in interchanging XML and JSON arises from different format requirements. XML messages always include a root name, whereas some dynamic languages, such as JSON, do not include a root name. In general, XML element contents do not have type assignments, whereas contents of dynamic language elements, such as JSON Boolean, string, and number elements, often have type assignments. It can be understood that the generation of an XML schema from JSON data can present multiple difficulties. Further difficulties can arise during parsing, validating and transformation of JSON data using such schemas if the schema does not match the JSON data. It is for these, and other, reasons that schemas are often manually created using a human actor.

SUMMARY

Embodiments of the present invention disclose a method, computer program product, and system for generating an XML schema from one or more JSON documents. A computer receives a first JSON data, wherein the first JSON data includes at least one JSON array or JSON object value. The computer parses a stream of JSON data, wherein the stream of JSON data includes at least a part of the first JSON data. The computer determines the logical structure of the first JSON data using the parsed stream of JSON data. The computer generates an XML schema based on the logical structure of the first JSON data.

DETAILED DESCRIPTION

In many implementations, XML documents are used to provide data to applications that perform various operations using the XML data. Commonly, such applications are configured to receive the XML data in a given order and having a specified format. If the data is provided in an incorrect order or having an improper format, it may be unusable by an application. Improperly configured XML data can cause application programs to fail or crash or cause other undesirable outcomes. Under such circumstances the XML document (and associated data) are considered "invalid". Consequently, applications are commonly equipped with programs that "validate" received XML documents.

If an XML document contains XML data in the proper order and of the correct format it is said to be valid and the application can operate on the data. One approach used to validate XML documents is to use an XML schema (which may be represented as a set of .xsd files) to validate the XML data. The schema can be included as part of the application or used as an add-on validation module. XML schema are used to describe the structure of XML documents. As is known to those having ordinary skill in the art, XML schema are useful for defining elements or attributes that can appear in a document. XML schema can be used to define what elements are child elements and the number and order of child elements. XML schema can also define whether an element is empty or can include text and can also define data types for elements and attributes as well as defining default and fixed values for elements and attributes. These features can be useful for defining and validating XML documents.

However, in common usage, the data and structure of XML documents are constantly changing. Additionally, each change of data or structure typically necessitates a corresponding change in the associated XML schema. In the current art, many such schema must be changed or rewritten by hand to implement the changes. Such changes may be relatively simple to effectuate. However, most schema are very complex and the process of carefully and accurately generating suitable schema can be extremely time consuming.

In general, using conventional processes, generating accurate schema capable of validating XML documents is a laborious, meticulous, and time consuming process. Typically, in order to generate a schema for an XML (or similar) document, the labor-intensive manual process must be performed by a human actor. Unless an XML schema exists, the XML is merely text with some extra information. For example, if one data element in the text files changes or is incorrect, the application using the XML can crash or not function properly. As such, an XML schema defines what data is expected in the XML text file (such a schema is very valuable to applications and application developers).

The automatic generation of XML schema from XML documents is currently known in the art. What is needed is an interchange between JSON and XML, i.e., the ability to process JSON as if JSON were XML. In that regard, XML Schema are needed to govern the XML processing and handling of JSON data. Therefore, similar to the need to automatically generate XML schema from XML data, there is a need to automatically generate XML schema from JSON data. However, due to multiple difficulties in JSON to XML transformations, many issues can arise that hinder the generation of an XML schema from JSON data.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable storage medium. Computer-readable media comprise all computer-readable media, with the sole exception being a transitory, propagating signal. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures.

Figure 1:
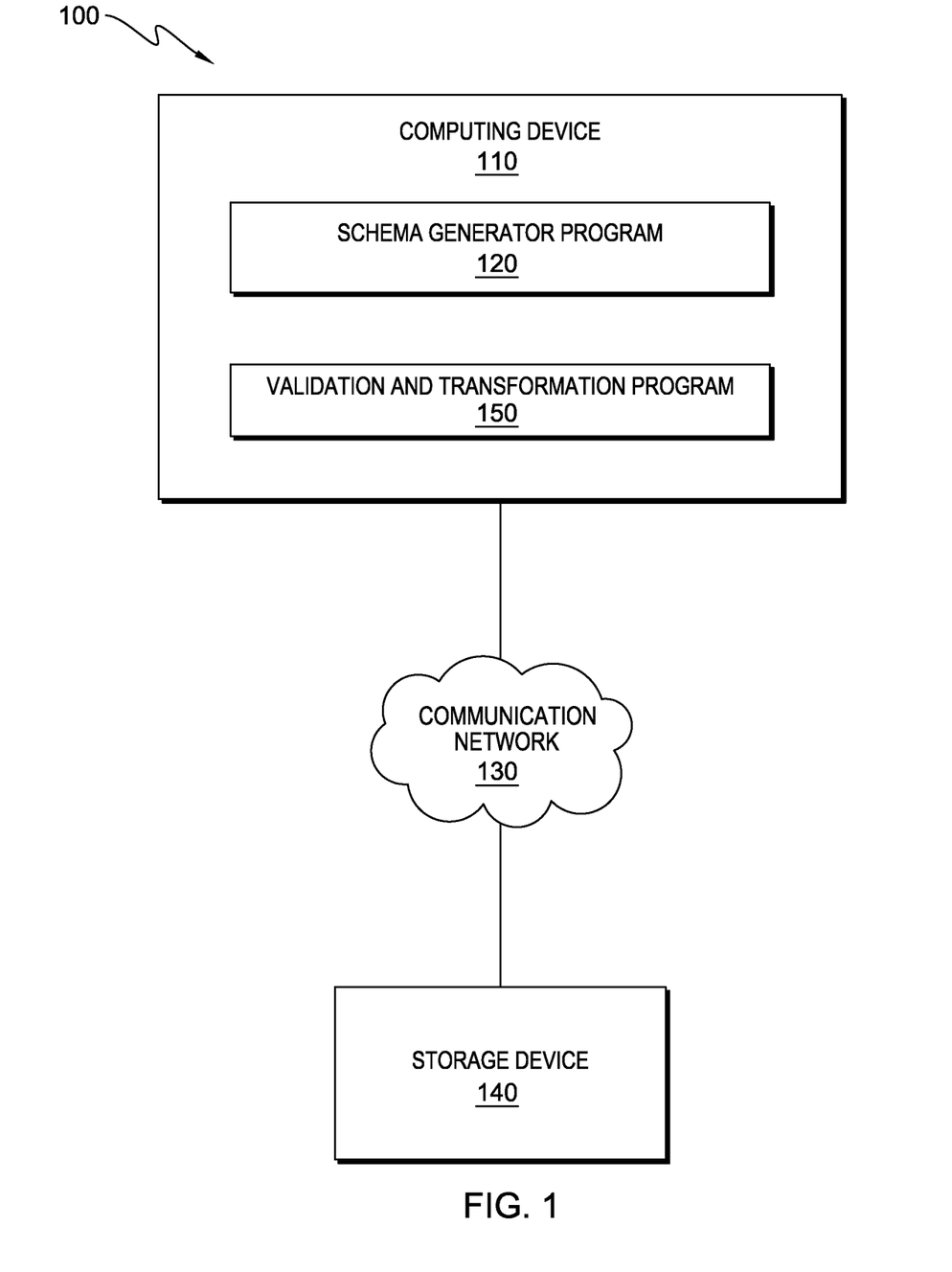
FIG. 1 is a block diagram illustrating a JSON processing environment, in accordance with an embodiment of the present invention.

FIG. 1 is a block diagram illustrating a JSON processing environment, generally designated 100, in accordance with one embodiment of the present invention. JSON processing environment 100 includes computing device 110 and storage device 140, which are interconnected over communication network 130. Computing device 110 includes schema generator program 120, and validation and transformation program 150.

In this exemplary embodiment, storage device 140 is, in general, an external storage device used to store data and transmit that data to computing device 110. Typically, the data stored in storage device includes XML schemas, JSON data, XML data, or any other type of data that may be required for the functioning of schema generator program 120, and validation and transformation program 150. However, in other embodiments, storage device 140 can store other types of data, such as programs, and may perform some of the functions of computing device 110. For further details, as to the function of storage device 140 and the types of data included in storage device 140, see the discussion of FIG. 3.

In this exemplary embodiment, schema generator program 120, and validation and transformation program 150 are stored on computing device 110. However, in other embodiments, schema generator program 120, and validation and transformation program 150 may be stored externally and accessed through a communication network, such as communication network 130. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 110 and schema generator program 120, and validation and transformation program 150 in accordance with a desired embodiment of the present invention.

In various embodiments of the present invention, computing device 110 can be a server, a laptop computer, a tablet computer, a netbook computer, a personal computer (PC), or a desktop computer. In another embodiment, computing device 110 represents a computing system utilizing clustered computers and components to act as a single pool of seamless resources. In general, computer 110 can be any computing device or a combination of devices with access to storage device 140, schema generator program 120, and validation and transformation program 150 and is capable of running schema generator program 120, and validation and transformation program 150. Computing device 110 may include internal and external hardware components, as depicted and described in further detail with respect to FIG. 4.

In this exemplary embodiment, in general, validation and transformation program 150 validates and transforms JSON and XML data. Validation and transformation program 150 uses one validating engine to parse and validate XML and JSON data and uses one transformation engine to transform and map both XML and JSON data. Validation and transformation program 150 includes or can generate validation and transformation engines to accommodate the transformation to be applied to a given dataset (e.g., XML and JSON datasets). Validation and transformation program 150 further includes readers to read streaming data. Typically, validation and transformation program 150 receives data from storage device 140. However, in other embodiments, validation and transformation program 150 can receive data from other sources, such as schema generator program 120 and the internet. See the discussion of FIG. 3 for further details regarding the function of validation and transformation program 150.

In this exemplary embodiment, in general, schema generator program 120 receives a sample of JSON data, such as a JSON document, and generates an XML schema based on the received JSON data. However, in other embodiments, the sample of JSON data can be an already parsed JSON tree, or a fragment of it (as opposed to a root). Typically, schema generator program 120 parses the sample of JSON data and identifies the logical structure of the data. Often, this results in the generation of a "tree" after parsing a JSON input. However, in other embodiments, the logical structure can be represented by a sequence of events, a file, or a data that represents the logical structure of the JSON input.

In this exemplary embodiment, schema generator program 120 generates an XML schema from a single set of JSON data. However, in some embodiments, the generated XML schema can be augmented and/or refined using a second set of JSON data. For example, the generated XML schema can be augmented to facilitate elements of the second set of JSON data, which were not present in the first set of JSON data.

Figure 2:
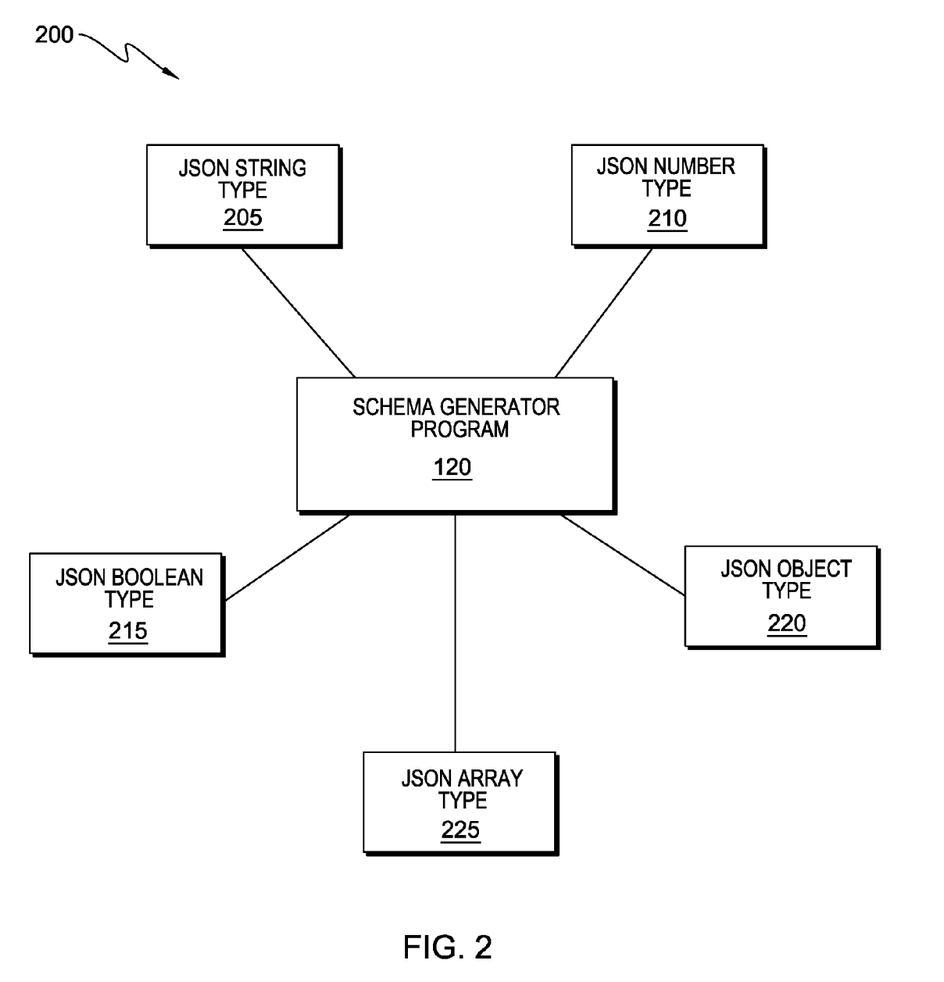
FIG. 2 is a block diagram illustrating examples of the classes of JSON data which can be used to generate an XML schema.

In this exemplary embodiment, FIG. 2 illustrates a block diagram, 200, showing examples of the classes of JSON data which can be used to generate an XML schema. In general, schema generator program 120 generates an XML schema from one or more JSON array or object values based on user options. Typically, a JSON scanner, included in schema generator program 120, parses JSON data and makes the logical structure of JSON data available to schema generator program 120. In general, a JSON document, herein contains a root JSON value object. In general, a JSON object, herein, contains a map from names to JSON values. In general, a JSON array is herein defined as an array of JSON values.

In this exemplary embodiment, schema generator program 120 reads a sample of the JSON data and generates a tree of JSONValue objects to understand its logical structure. An example showing read JSON data is shown, in part, as follows:

```
{
    "firstName": "John",
    "lastName": "Smith",
    "age": 25,
    "address": {
        "streetAddress": "21 2nd Street",
        "city": "New York",
        "state": "NY",
        "postalCode": "10021"
    },
    "phoneNumbers": [
        {"type":"home", "number": "212 555-1234"},
        {"type": "fax", "number": "646 555-4567"}
    ],
    "newSubscription": false,
    "companyName": null
}
```

In this exemplary embodiment, schema generator program 120 uses the logical structure of the JSON data to generate an XML schema. In general, schema generator program 120 identifies common elements found in all the sample JSON data, i.e., a JSON pair that appears in one instance document and not in another. These elements are included in the XML schema. However, elements which appear in only some datasets, included in the sample JSON data, are still taken into account as optional elements in the XML schema. In other words, elements that are marked as optional in the schema are not required for a valid input. However, optional elements are not excluded from the schema. These optional elements can be selected for inclusion or exclusion in an output per the desire of a given client. A variety of XML schema types can be generated using various JSON data types. For example, JSON data types such as string, number, Boolean, object, and array can be evaluated to generate corresponding XML schema for those JSON data types.

For example, in this exemplary embodiment, schema generator program 120 can convert JSON string type 205 data into XML schema type data using two different options. Option one, using a complex "string" type data, is as follows:

```
<xs:complexType name='string'>
    <xs:simpleContent>
        <xs:extension base='xs:string'>
            <xs:attribute name='type' type='xs:string'
            fixed='string'/>
        </xs:extension>
    </xs:simpleContent>
</xs:complexType>
```

In this exemplary embodiment, complex "string" type generated using option one can yield a generated XML schema segment such as:
<xs:element name='lastName' minOccurs='0' nillable='true' type='string'/>

In this exemplary embodiment, option two uses built-in "xs:string" type data, which would generate an XML schema segment such as:
<xs:element name='lastName' minOccurs='0' nillable='true' type='xs:string'/>

In the above two options, in this exemplary embodiment, for JSON string type data, there is one available configuration option, namely an attribute configuration that controls whether or not to use the complex "string" type, i.e., option one, or the XML schema built-in type, i.e., option two, xs:string.

In another example, for this exemplary embodiment, schema generator program 120 can convert JSON number type 210 data into XML schema type data using two possible options. Option one, using complex "number" type data, is as follows:

```
<xs:complexType name='number'>
    <xs:simpleContent>
        <xs:extension base='xs:double'>
            <xs:attribute name='type' type='xs:string'
            fixed='number'/>
        </xs:extension>
    </xs:simpleContent>
</xs:complexType>
```

In this exemplary embodiment, an example of a generated XML schema segment using option one for complex "number" type data is:
<xs:element name='age' minOccurs='0' nillable='true' type='number'/>

In the second option, of this exemplary embodiment, an XML built-in type "xs:double" can be used by schema generator program 120 to generate an XML schema segment such as:
<xs:element name='age' minOccurs='0' nillable='true' type='xs:double'/>

In the above two options, in this exemplary embodiment, for JSON number type data there are two available configuration options. The first option is an option based on an attribute configuration that controls whether or not to use the complex type "number" or use an XML built in type. The second option is an option based on a type name that controls which XML built-in numeric type will be mapped to the JSON number type.

In this exemplary embodiment, to convert JSON Boolean type 215 data, schema generator program 120 can use the following:

```
<xs:complexType name='boolean'>
    <xs:simpleContent>
        <xs:extension base='xs:boolean'>
            <xs:attribute name='type' type='xs:string'
            fixed='boolean'/>
        </xs:extension>
    </xs:simpleContent>
</xs:complexType>
```

A generated XML schema segment using the above process can be:
<xs:element name='newSubscription' minOccurs='0' nillable='true' type='boolean'/>
A generated XML segment using built-in type "xs:boolean" could be <xs:element name='lastName' minOccurs='0' nillable='true' type='xs:boolean'/>

In the above two options for this exemplary embodiment, for JSON Boolean type data, there is one available configuration option, namely an attribute configuration that controls whether or not to use the complex type "boolean" or use the XML built-in type "xs:boolean".

If the data being processed is JSON object type 220 data, then, in this exemplary embodiment, schema generator program 120 can generate a complex type "object", such as:

```
<xs:complexType name='object'>
    <xs:sequence>
        <xs:any processContents='skip' minOccurs='0'
        maxOccurs='unbounded'/>
    </xs:sequence>
    <xs:attribute name='type' type='xs:string' fixed='object'/>
</xs:complexType>
```

Then other XML schema types corresponding to JSON object types can be generated as restrictions of the complex type "object". An example of an XML schema segment generated by the above process, based on the object type of the JSON data, is as follows:

```
<xs:element name='address' minOccurs='0' nillable='true'>
    <xs:complexType>
        <xs:complexContent>
            <xs:restriction base='object'>
                <xs:all>
                    <!-- XML schema segments for the children of
                    the JSON object -->
                </xs:all>
            </xs:restriction>
        </xs:complexContent>
    </xs:complexType>
</xs:element>
```

In this exemplary embodiment, for JSON array type 225 data, the array would be processed by schema generator program 120 using, for example:

```
<xs:complexType name='array'>
    <xs:sequence>
        <xs:any processContents='skip' minOccurs='0'
```

```
            maxOccurs='unbounded'/>
        </xs:sequence>
        <xs:attribute name='type' type='xs:string' fixed='array'/>
    </xs:complexType>
```

In this exemplary embodiment, an XML schema segment would then be generated by modeling JSON array type 225 data as a restriction of the complex type "array", for example:

```
<xs:element name='myArray' minOccurs='0' nillable='true'>
    <xs:complexType>
        <xs:complexContent>
            <xs:restriction base='array'>
                <xs:choice minOccurs='0' maxOccurs='unbounded'>
                    <xs:element name='stringValue' type='xs:string'/>
                    <xs:element name='numberValue'
                        type='xs:double'/>
                    <xs:element name= 'boolean Value'
                        type='xs:boolean' />
                    <xs:element name='nullValue' nillable='true'
                        type='xs:anyType' />
                    <xs:element name='objectValue' >
                        <!--an anonymous complexType is created to
represent the objects included in the myArray-->
                    </xs:element>
                    <xs:element name='arrayValue' >
                        <!--an anonymous complexType to present
all the nested arrays included in the myArray-->
                    </xs:element>
                </xs:choice>
            </xs:restriction>
        </xs:complexContent>
    </xs:complexType>
</xs:element>
```

In this exemplary embodiment, schema generator program 120 can use an array for phone numbers that contains two object values to generate an XML schema element declaration. For example, such an element declaration can be:

```
<xs:element name='phoneNumbers' minOccurs='0'
    nillable='true'>
    <xs:complexType>
        <xs:complexContent>
            <xs:restriction base='array'>
                <xs:choice minOccurs='0' maxOccurs='unbounded'>
                    <xs:element name='nullValue' nillable='true'
                        type='xs:anyType'/>
                    <xs:element name='objectValue'>
                        <xs:complexType>
                            <xs:complexContent>
                                <xs:restriction base='object'>
                                    <xs:all>
                                        <xs:element name='number'
                                            minOccurs='0' nillable='true'
                                            type='string'/>
                                        <xs:element name='type' minOccurs='0'
                                            nillable='true' type='string'/>
                                    </xs:all>
                                </xs:restriction>
                            </xs:complexContent>
                        </xs:complexType>
                    </xs:element>
                </xs:choice>
            </xs:restriction>
        </xs:complexContent>
    </xs:complexType>
</xs:element>
```

Figure 3:
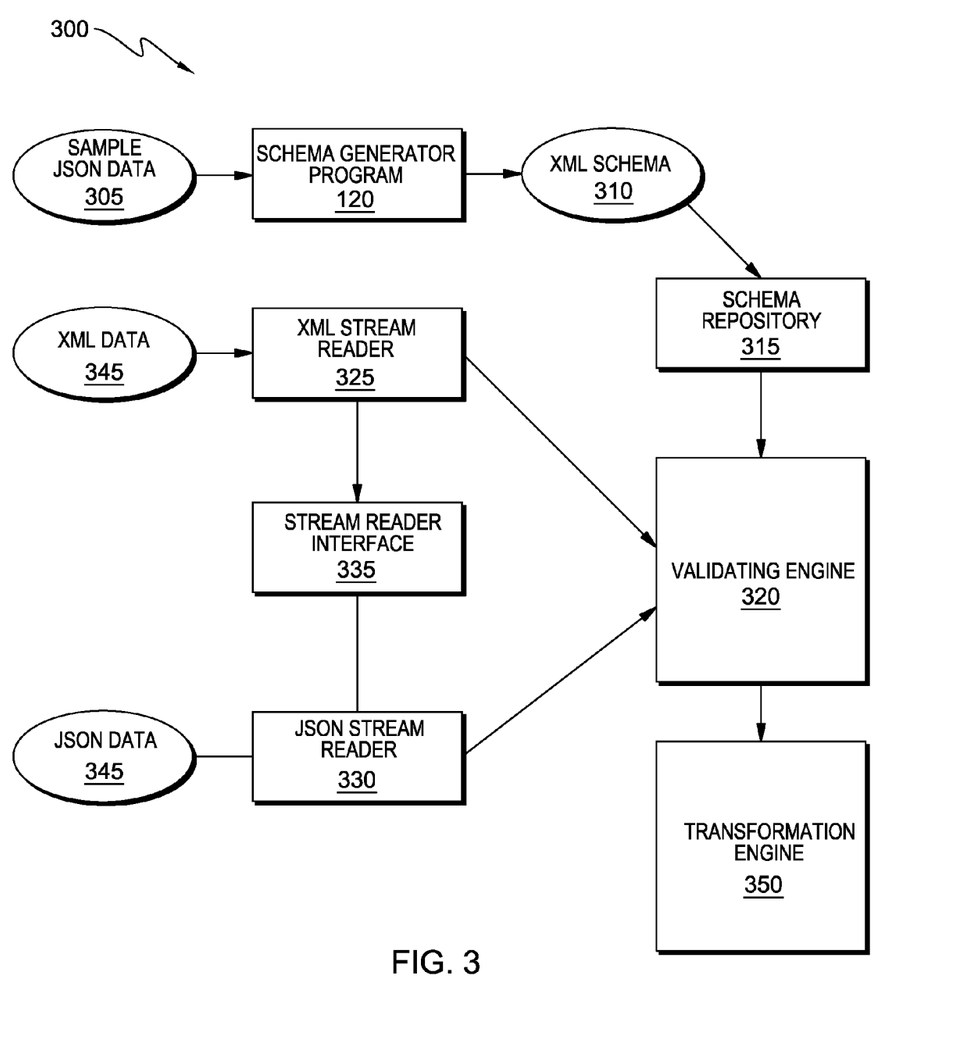
FIG. 3 is a block diagram illustrating how one validating engine and one transformation engine can be used to parse, validate, and map XML and JSON data

In this exemplary embodiment, FIG. 3 is a block diagram, 300, illustrating how one validating engine and one transformation engine can be used, by validation and transformation program 150, to parse, validate, and map XML and JSON data.

Schema generator program 120 reads JSON sample data 305, which is stored on storage device 140, and produces a respective XML schema 310. XML schema 310 is then passed to schema repository 315, which is included storage device 140, for storage and processing.

In this exemplary embodiment, based on the generated XML schema, a validating engine is generated by validating engine 320. Both XML stream reader 325 and JSON stream reader 330 implement a common streaming interface stream reader interface 335. XML stream reader 325 reads XML data 340 and sends a stream of events to validating engine 320. JSON stream reader 330 reads JSON data 345 and sends a stream of events to validating engine 320. Validating engine 320 processes the incoming events, validates the data, and sends a stream of events to transformation engine 350.

Figure 4:
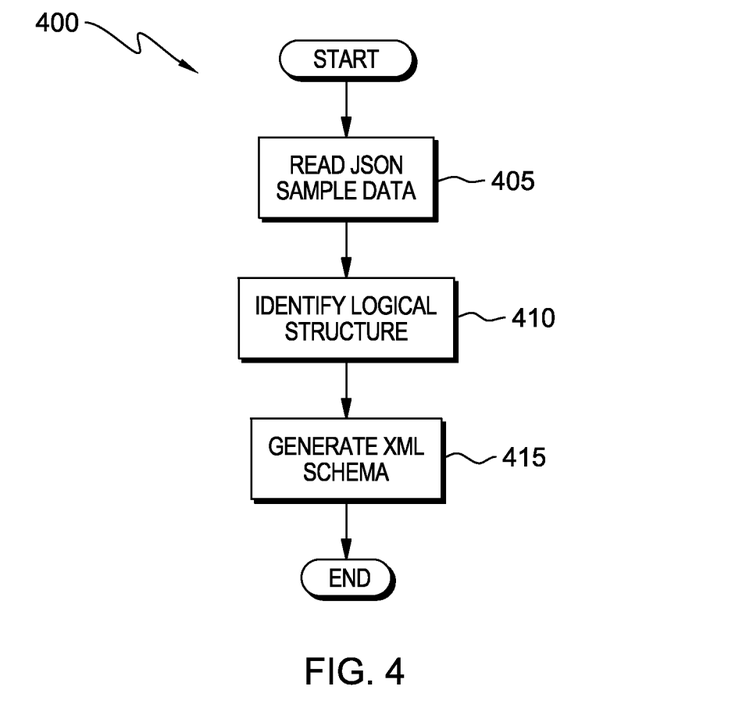
FIG. 4 illustrates operational steps of a schema generator program operating within the data processing environment of FIG. 1, in accordance with an embodiment of the present invention.

In this exemplary embodiment, FIG. 4 is a flowchart, 400, depicting operational steps of schema generator program 120 for the generation of XML schema using JSON data, in accordance with an embodiment of the present invention.

First, in this exemplary embodiment, schema generator program 120 reads a sample of JSON data, in step 405. Next, in step 410, schema generator program 120 identifies the logical structures of the JSON value objects, based on the read sample of JSON data. Then, in step 415, schema generator program 120 converts JSON data types to XML data types and generates an XML schema based on the identified the logical structures of the JSON value objects.

Figure 5:
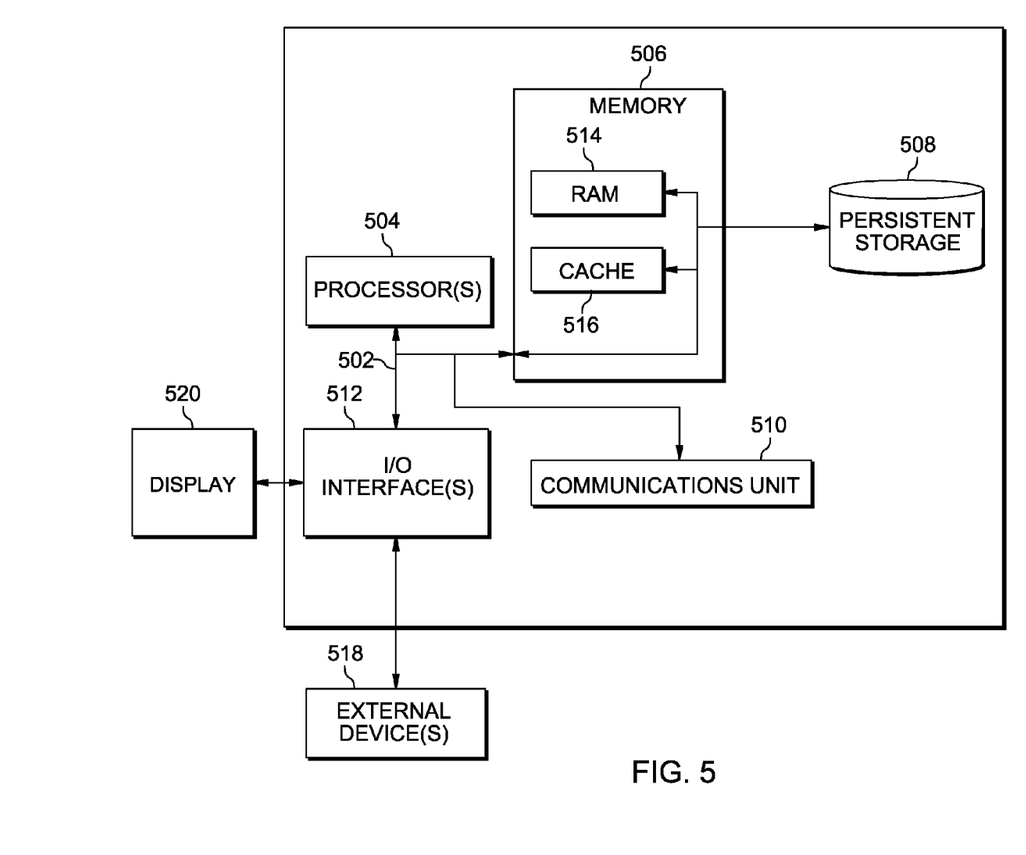
FIG. 5 depicts a block diagram of components of the computing device executing the schema generator program, in accordance with an embodiment of the present invention.

In this exemplary embodiment, FIG. 5 depicts a block diagram of components of computing device 110 and storage device 140 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 110 and storage device 140 respectively include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Schema generator program 120, and validation and transformation program 150 are stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of computing device 110 and storage device 140. In these examples, communications unit 510 includes one or more network interface cards. Communications unit 510 may provide communications through the use of either or both physical and wireless communications links. Schema generator program 120, and validation and transformation program 150 may be downloaded to persistent storage 508 through communications unit 510.

I/O interface(s) 512 allows for input and output of data with other devices that may be connected to computing device 110 and storage device 140. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, schema generator program 120, and validation and transformation program 150, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for generating XML schema from JSON data, the method comprising:

A computer receiving a first JSON data, wherein the first JSON data includes at least one JSON array or JSON object value;

the computer parsing a stream of JSON data, wherein the stream of JSON data includes at least a part of the first JSON data;

the computer determining a logical structure of the first JSON data using the parsed stream of JSON data; and the computer automatically generating an XML schema based on the logical structure of the first JSON data, wherein the XML schema is adapted to reflect one or more common elements identified in the first JSON data and one or both of an order of XML data and a format of XML that are required by a program such that the generated XML schema enables processing of the first JSON data by the program as if the first JSON data were written in XML.

2. The method of claim 1, further including the step of:
the computer augmenting the generated XML schema using a second JSON data, wherein the second JSON data includes a JSON array or JSON object value.

3. The method of claim 2, further including the steps of:
the computer parsing a third JSON data; and
the computer validating the third JSON data using the generated XML schema.

4. The method of claim 3, wherein the computer uses one validating engine to parse and validate the third JSON data using the generated XML schema.

5. The method of claim 3, further including the steps of:
the computer transforming the third JSON data; and
the computer mapping the third JSON data.

6. The method of claim 5, wherein the computer uses one transforming engine to transform and map the third JSON data.

7. The method of claim 1, wherein the first JSON data is included, at least in part, in a JSON document.

8. A computer program product for generating XML schema from JSON data, the computer program product comprising:
one or more computer-readable storage media and program instructions stored on the one or more computer-readable storage media, the program instructions comprising:
program instructions to receive a first JSON data, wherein the first JSON data includes at least one JSON array or JSON object value;
program instructions to parse a stream of JSON data, wherein the stream of JSON data includes at least a part of the first JSON data;
program instructions to understand a logical structure of the first JSON data using the parsed stream of JSON data; and
program instructions to automatically generate an XML schema based on the logical structure of the first JSON data, wherein the XML schema is adapted to reflect one or more common elements identified in the first JSON data and one or both of an order of XML data and a format of XML that are required by a program such that the generated XML schema enables processing of the first JSON data by the program as if the first JSON data were written in XML.

9. The computer program product of claim 8, further including the step of:
program instructions to augment the generated XML schema using a second JSON data, wherein the second JSON data includes a JSON array or object value.

10. The computer program product of claim 9, further including the steps of:
program instructions to parse a third JSON data; and
program instructions to validate the third JSON data using the generated XML schema.

11. The computer program product of claim 10, wherein the computer uses one validating engine to parse and validate the third JSON data using the generated XML schema.

12. The computer program product of claim 9, further including the steps of:
program instructions to transform the third JSON data; and
program instructions to map the third JSON data.

13. The computer program product of claim 12, wherein the computer uses one transforming engine to transform and map the third JSON data.

14. The computer program product of claim 9, wherein the first JSON data is included, at least in part, in a JSON document.

15. A computer system for generating XML schema from JSON data, the computer system comprising:
one or more computer processors;
one or more computer-readable storage media;
program instructions stored on the computer-readable storage media for execution by at least one of the one or more processors, the program instructions comprising:
program instructions to receive a first JSON data, wherein the first JSON data includes at least one JSON array or JSON object value;
program instructions to parse a stream of JSON data, wherein the stream of JSON data includes at least a part of the first JSON data;
program instructions to understand a logical structure of the first JSON data using the parsed stream of JSON data; and
program instructions to automatically generate an XML schema based on the logical structure of the first JSON data, wherein the XML schema is adapted to reflect one or more common elements identified in the first JSON data and one or both of an order of XML data and a format of XML that are required by a program such that the generated XML schema enables processing of the first JSON data by the program as if the first JSON data were written in XML.

16. The computer system of claim 15, further including the step of:
program instructions to augment the generated XML schema using a second JSON data, wherein the second JSON data includes a JSON array or object value.

17. The computer system of claim 16, further including the steps of:
program instructions to parse a third JSON data; and
program instructions to validate the third JSON data using the generated XML schema.

18. The computer system of claim 17, wherein the computer uses one validating engine to parse and validate the third JSON data using the generated XML schema.

19. The computer system of claim 16, further including the steps of:
program instructions to transform the third JSON data; and
program instructions to map the third JSON data.

20. The computer system of claim 19, wherein the computer uses one transforming engine to transform and map the third JSON data.

* * * * *